United States Patent [19]

Shih

[11] 4,123,796
[45] Oct. 31, 1978

[54] CONTROLLER FOR ENVIRONMENTAL CONDITIONING APPARATUS

[75] Inventor: James Y. Shih, Arlington Heights, Ill.

[73] Assignee: Powers Regulator Company, Skokie, Ill.

[21] Appl. No.: 743,110

[22] Filed: Nov. 19, 1976

[51] Int. Cl.² .................. G05b 11/32; G05d 23/22; F24f 11/00
[52] U.S. Cl. .................................... 364/900; 165/22
[58] Field of Search ................. 364/900 MS File; 340/147 R, 163; 165/14, 22

[56] References Cited

U.S. PATENT DOCUMENTS

| | | | |
|---|---|---|---|
| 3,275,988 | 9/1966 | Yetter | 340/172.5 |
| 3,555,251 | 1/1971 | Shavit | 364/900 |
| 3,849,765 | 11/1974 | Hamano | 340/172.5 |
| 3,899,776 | 8/1975 | Sicko et al. | 340/172.5 |
| 3,933,197 | 1/1976 | Zimmer et al. | 165/2 |
| 3,944,987 | 3/1976 | Koyanagi et al. | 340/172.5 |

Primary Examiner—Gareth D. Shaw
Assistant Examiner—C. T. Bartz
Attorney, Agent, or Firm—Fitch, Even, Tabin & Luedeka

[57] ABSTRACT

A controller is disclosed for use in controlling environmental conditioning apparatus such as heating and air conditioning equipment in a building or the like. The controller is flexible in that it can control most types of such control devices and apparatus and it eliminates the necessity of a conventional local controller while permitting the use of a centrally controlled automated system if such is desired. The controller is self-contained in that it preferably has a display and keyboard for establishing and changing the operational limits of the apparatus that is to be controlled. Only one sensing device is needed for each apparatus that is controlled, since the signals that are generated by the sensing devices are compatible with the controller as well as with a central automated system if such is used. The controller eliminates the need for a conventional local controller for each apparatus and permits one controller to be used in conjunction with a plurality or a group of control devices.

18 Claims, 10 Drawing Figures

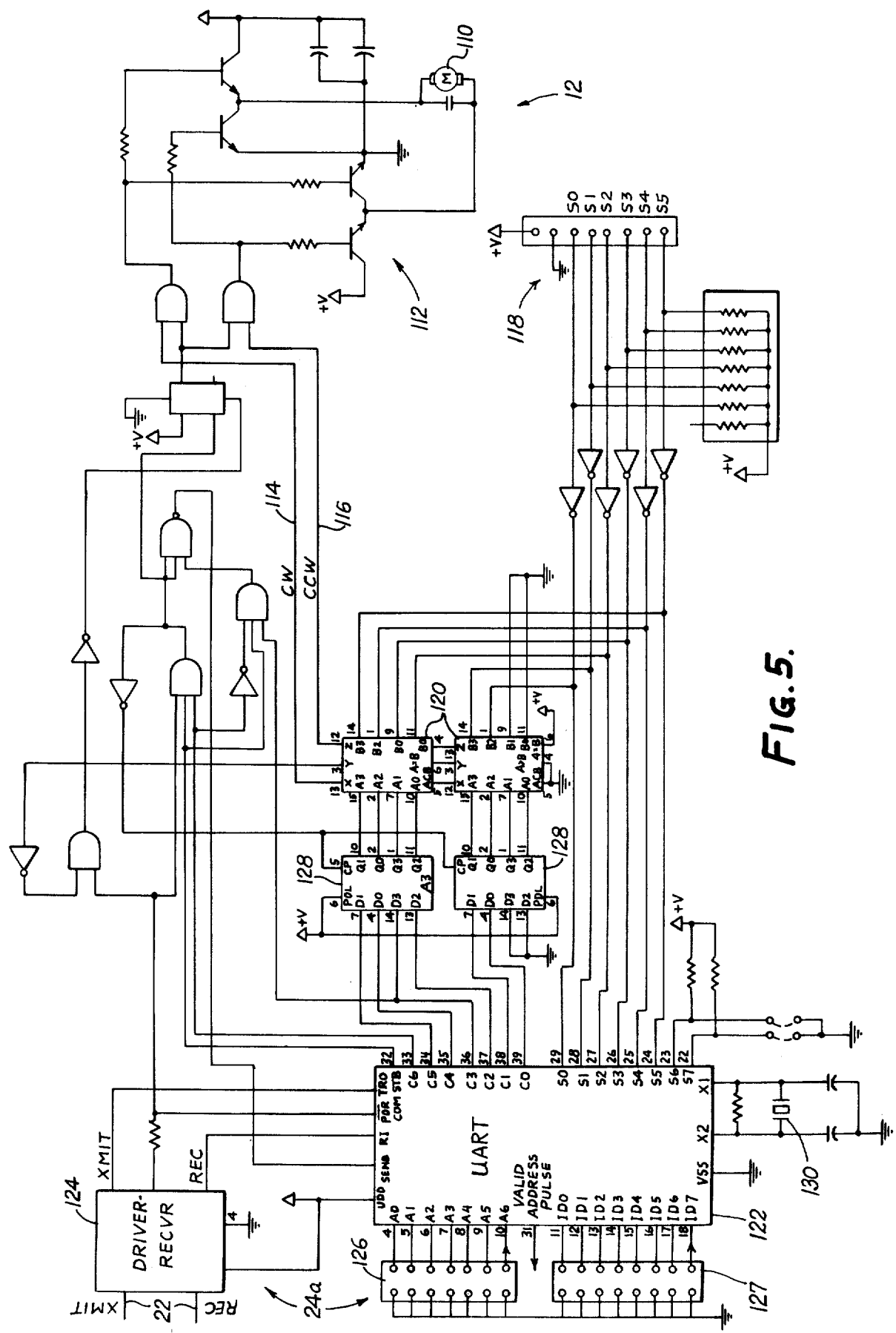

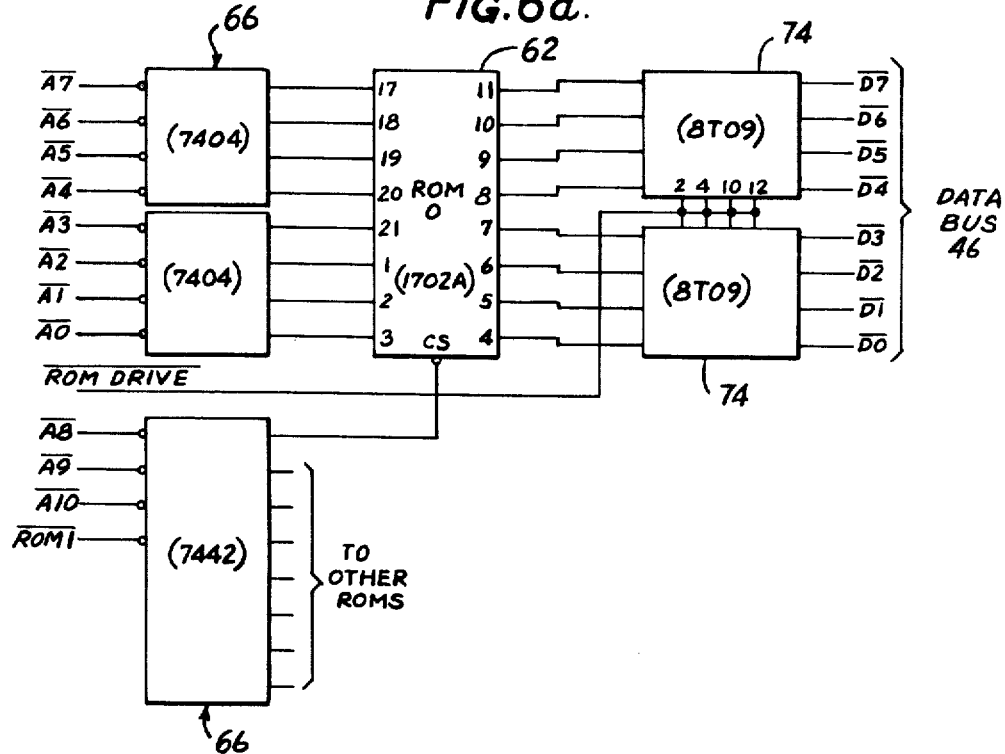

CONTROLLER FOR ENVIRONMENTAL CONDITIONING APPARATUS

The present invention generally relates to heating, air conditioning and, more particularly, to an improved controller that can be used for a plurality of control apparatus or devices.

The use of a centrally located computer in an automated system of controlling the temperature, humidity and other environmental conditions in large buildings permits a smaller labor force in the operation of their physical plant. The central control also facilitates adjustment of the environment conditions to maximize the efficiency of the operation of the system to save fuel and lower the energy costs for the building. Since a building having a central control computer may require only one operator on duty at a time in contrast to a sizeable labor force in the absence of such central control, the trend has been toward the installation of automated systems, particularly in new construction. However, many, if not most of the buildings that utilize a central computer in an automated system for controlling the environmental control equipment, also have local controllers for the controlled devices or apparatus. While the central computer permits the desired efficiency of operation in terms of the smaller labor force and energy conservation, the initial cost are higher because of the use of local controllers in addition to the central control system.

In many systems, there are sensing devices, i.e., temperature, humidity sensors and the like for the local controllers as well as for the central control systems. In such systems, the central control system sensor provides a signal for the central control system and the system merely sends a signal to the local controller for adjusting the set point of the controller and the actual control of the apparatus or device which adjusts the temperature of the area is performed by the local controller through its own sensor. While the use of a central control system in this manner has the above described advantages, it should be appreciated that the overall cost of the building environmental control system is increased because of the duplication of equipment.

Accordingly, it is an object of the present invention to provide an improved controller for one or more local control devices, which can also be used in a central control system if desired.

Another object of the present invention is to provide an improved group controller that eliminates the need for a local controller and which issues commands to each of a plurality of control devices for controlling the same.

Still another object of the present invention is to provide a controller that directly controls the control devices, has one sensing device associated with each control device and which can be provided with sophisticated instructions for maximizing the efficiency of operation and conserving energy.

Other objects and advantages will become apparent upon reading the following detailed description in conjunction with the attached drawings in which:

FIG. 5 is a schematic diagram of a transmitting-/receiving, identification and adjusting means portions of the present invention;

FIGS. 6a, 6b, 6c and 6d are electrical circuit diagrams of portions of the apparatus shown in the block diagram of FIG. 4; and, FIG. 7 is a timing diagram showing the basic structure of the data words used between the controller and the identification module in the system of the present invention.

Figure 1:
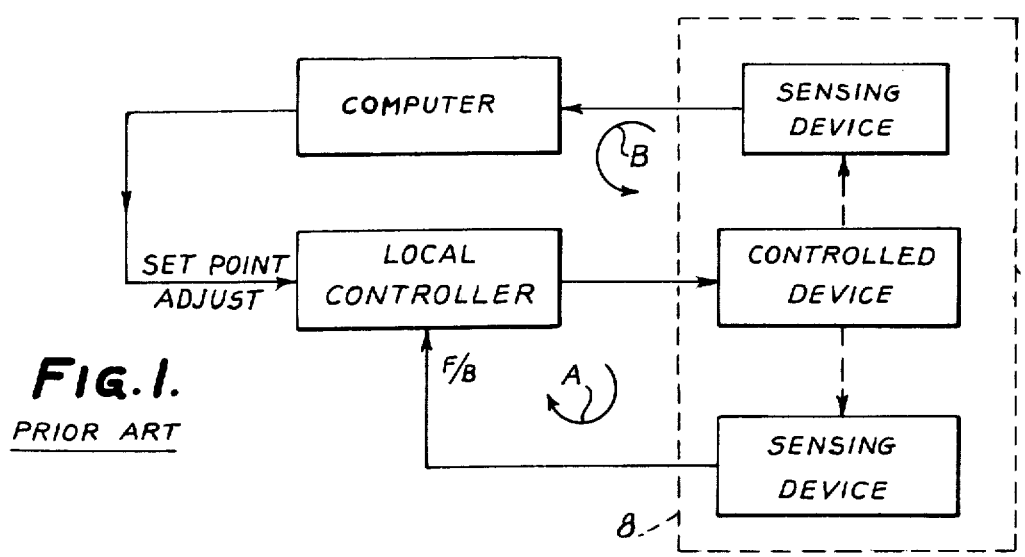
FIG. 1 is a block diagram of prior art systems which utilize a local control in addition to a computer controlled automated system.

Turning now to the drawings and particularly FIG. 1, a block diagram of typical prior art systems is shown to include a controlled device within dotted line box 8, which may be a control valve, damper or the like which represents one of many of the local control devices that are present in environmental and temperature control equipment in a building, for example. The controlled device is controlled by a local controller which is operative to adjust the device, such as increase or decrease the amount of hot or cool air that is to pass through the unit, or other similar adjustment of the device. The local controller is a part of the feedback control loop, and has a sensing device associated with it which monitors the condition that the controlled device governs. For example, the sensing device may be a thermostat which measures the temperature of the air within an area and provides a feedback signal to the local controller which causes the controlled device to be adjusted in the event the temperature is outside of the desired range. This type of control loop designated by the arrow A is typical for many systems, including those that have automated computer control. As can be seen from FIG. 1, a second sensing device is also located in proximity to the controlled device for measuring the same parameter that the other sensing device measures, with the second sensing device providing an indication to the computer controlled system which compares the values with the desired preset values and issues a command, if necessary, for the purpose of changing the set point adjustment of the local controller. The second sensing device, computer and the local controller provide a second control loop, indicated by the arrow B, which supplements the control loop A previously described. It should therefore be appreciated that the use of the automated computer controlled system provides redundant functioning in many respects, and the addition of the computer and associated equipment represents an additional cost over and above the local controller equipment that is still required. While some systems have utilized a single sensing device for providing indications to the local controller as well as to the computer, the computer and local controllers are still required in such systems and a local controller is needed for each and every controlled device.

Figure 2:
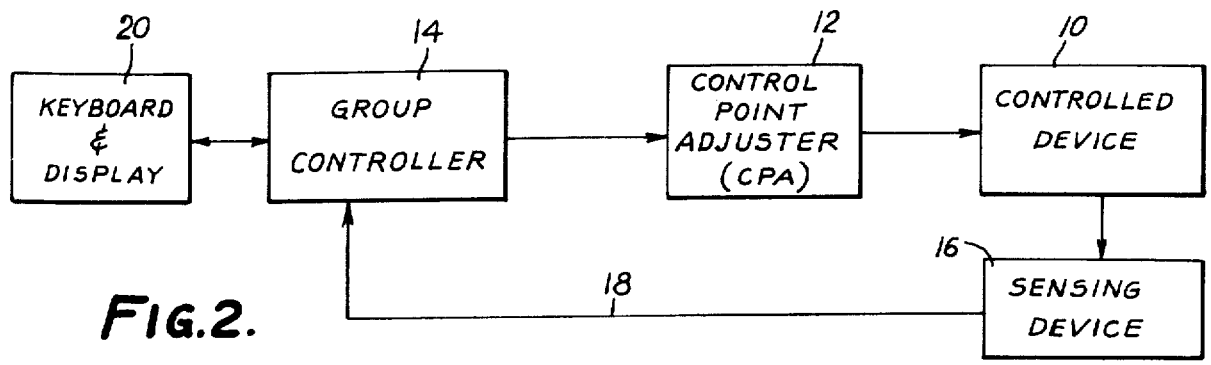
FIG. 2 is a block diagram illustrating one embodiment of the present invention.

Turning now to an embodiment of the present invention shown in FIG. 2, a controlled device 10 is controlled by a control point adjuster (CPA) 12 which translates electrical signals to mechanical movement for physically adjusting the device 10. The control point adjuster is in turn controlled by a controller 14 which may be used to control a number of CPA's 12 and devices 10, although only the single CPA and device is shown in FIG. 2. A sensing device 16 is provided for monitoring the parameter that the device 10 controls and provides a feedback signal to the controller 14 via line 18 so that the controller can issue appropriate commands to the CPA 12 for regulating the device 10 to maintain its controlled parameter within the desired range. As will be hereinafter explained, the controller 14 has memory which can be provided with instructions for controlling the various CPA's that are associated with it. A keyboard and display unit 20 is preferably provided adjacent the controller 14 for entering the specific instructions and for providing and/or changing the limits of the parameters that are to be controlled. The keyboard and display 20 may be a teleprinter in which information is automatically typed out or it may comprise a cathode ray tube on which the information can be displayed. Both types of display preferably have an alpha-numeric keyboard, such as a typewriter keyboard for entering and changing instructions and providing limit values and the like.

Figure 3:
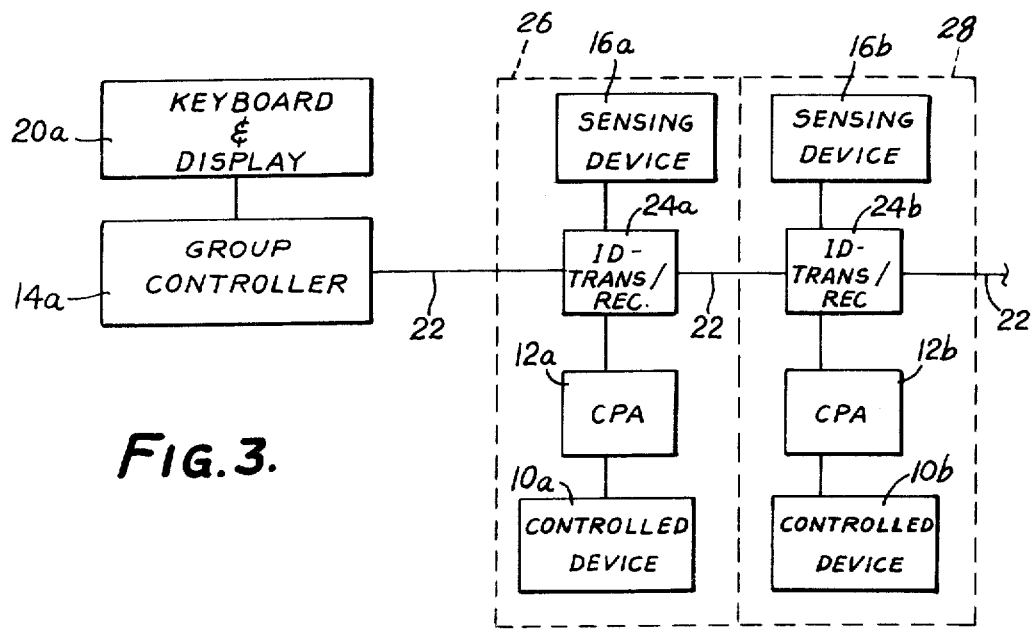
FIG. 3 is a more detailed block diagram illustrating the present invention.

Turning now to the embodiment of the present invention illustrated in FIG. 3, a group controller 14a is illustrated together with a number of separate controlled devices 10a, 10b which have associated CPA's 12a, 12b as well as sensing devices 16a, 16b which are connected to the group controller via lines 22 which may extend to a large number of devices. An identification and transmitter/receiver module is provided for each of the devices 24a and 24b so that one to one correspondence can occur between the group controller and the equipment shown in dotted line boxes 26 and 28 associated with each of the controlled devices, respectively. In this regard, the group controller preferably issues an address identification code when communication is to be established with a particular module 24a, 24b or the like and each module is adapted to respond to its own unique address. In this manner, a single group controller 14a can effectively control a number of control devices rather than a single device.

An important advantage to the embodiment illustrated in FIG. 3 is the virtual elimination of a local controller for each controlled device, with the group controller 14a serving the function of the local controller. Moreover, the group controller 14a is compatible with automated computer controlled systems and can be connected to a central computer without requiring additional equipment other than suitable communication links between the group controllers and the computer. Each of the group controllers preferably has the keyboard and display unit 20a which may be substantially similar to that described with respect to FIG. 2.

Figure 4:
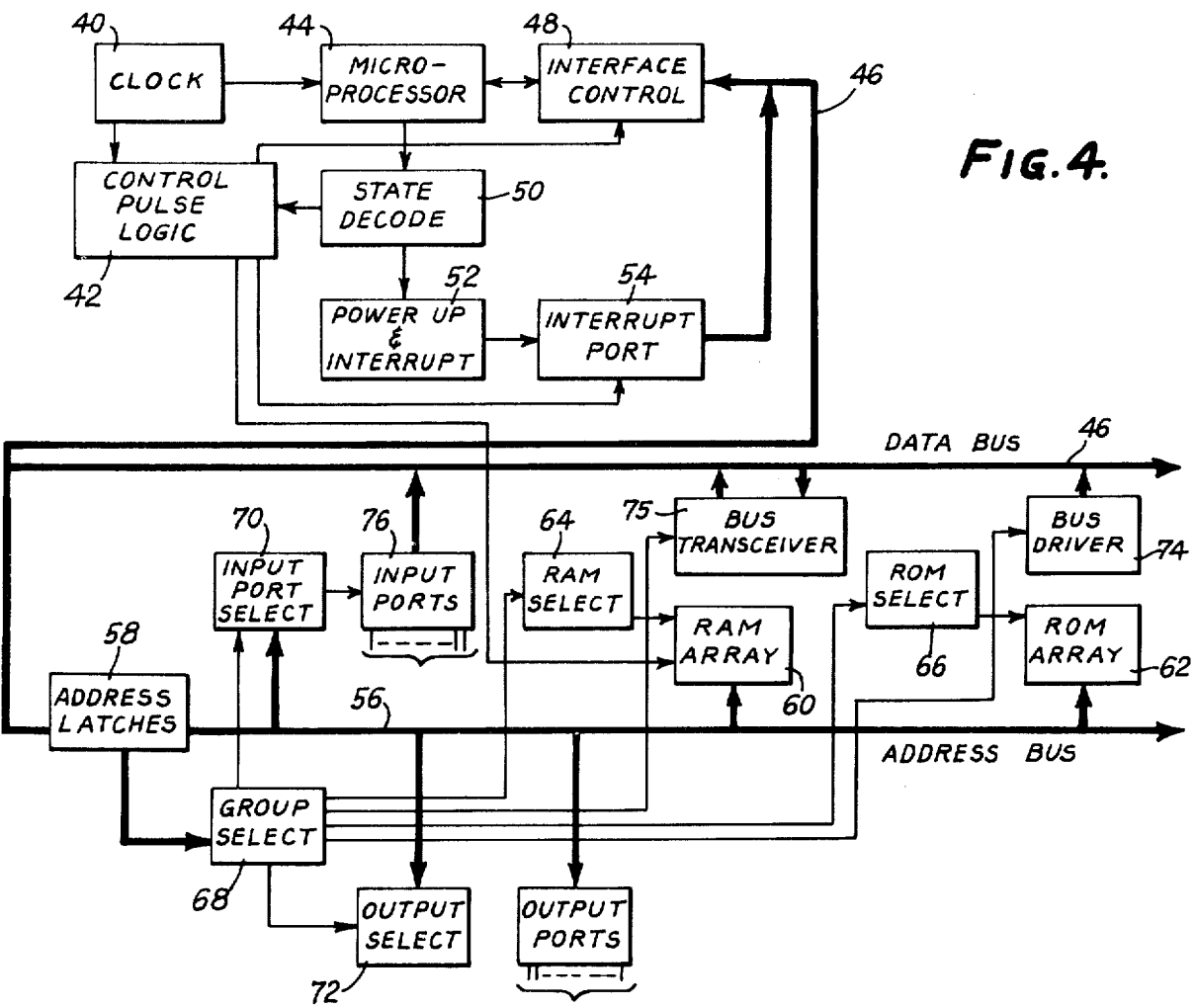
FIG. 4 is a block diagram of the controller portion used in the present invention.

Turning now to the block diagram of the group controller 14a shown in FIG. 4, it has a clock 40 which provides the basic operating frequency for transmitting information to and from the controller and the clock drives a control pulse logic circuit 42 and a microprocessor 44. The microprocessor 44 is connected to a data bus 46 through an interface control circuit 48. The microprocessor 44 controls a state decode circuit 50 which controls the control pulse logic circuit 42 as well as power up and interrupt circuitry 52 which is used to condition the group controller when it is turned on or when normal operation is interrupted. The state decode circuit 50 can force the power up and interrupt circuitry 52 onto the data bus 46 through an interrupt port 54 for initializing the group controller 14a. In this regard, the power up and interrupt circuitry 52 may also include a separate microprocessor that is programmed with instructions for executing sequential operations for initializing or restarting the group controller. The data bus 46 is also connected to an address bus 56 through an address latching circuit 58. The microprocessor 44 may receive data from the data bus 46 and also transmit addresses through the address bus 56 and the data bus 46. The controller preferably has an array of random-acess-memories (RAM's) shown in the block 60 as well as an array of read-only-memories (ROM's) shown by the block 62. RAM select circuitry 64 and ROM select circuitry 66 are adapted to locate particular RAM's within the array in the event more than one RAM and ROM are present. It should be appreciated that the size of the arrays 60 and 62 that are present will be a function of the number of devices that are to be controlled, since the capacity of the memories must be able to accommodate the amount of information that has to be stored. A group select logic circuit 68 selectively controls an input port select circuit 70, as well as the RAM and ROM select circuits 64 and 66, a bus driver 74 and a bus transceiver 75. The input select circuitry 70 identifies and operatively connects various input ports 76 to the data bus 46 and the output select circuit 72 activates selective output ports 78 for issuing addresses.

The data bus 46 is bidirectional in that addresses are sent out over the address bus and data is also received through the the data bus with the direction being controlled by the interface control circuit 48 which generally comprises a number of bidirectional gates, which thereby selectively isolates the microprocessor 44 from the bidirectional bus 46 as is desired.

Figure 7:
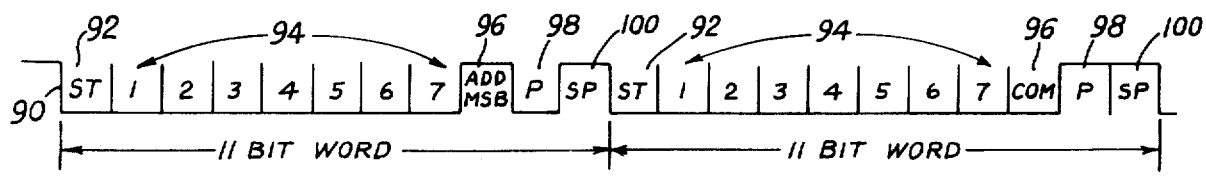
Figure 6A:
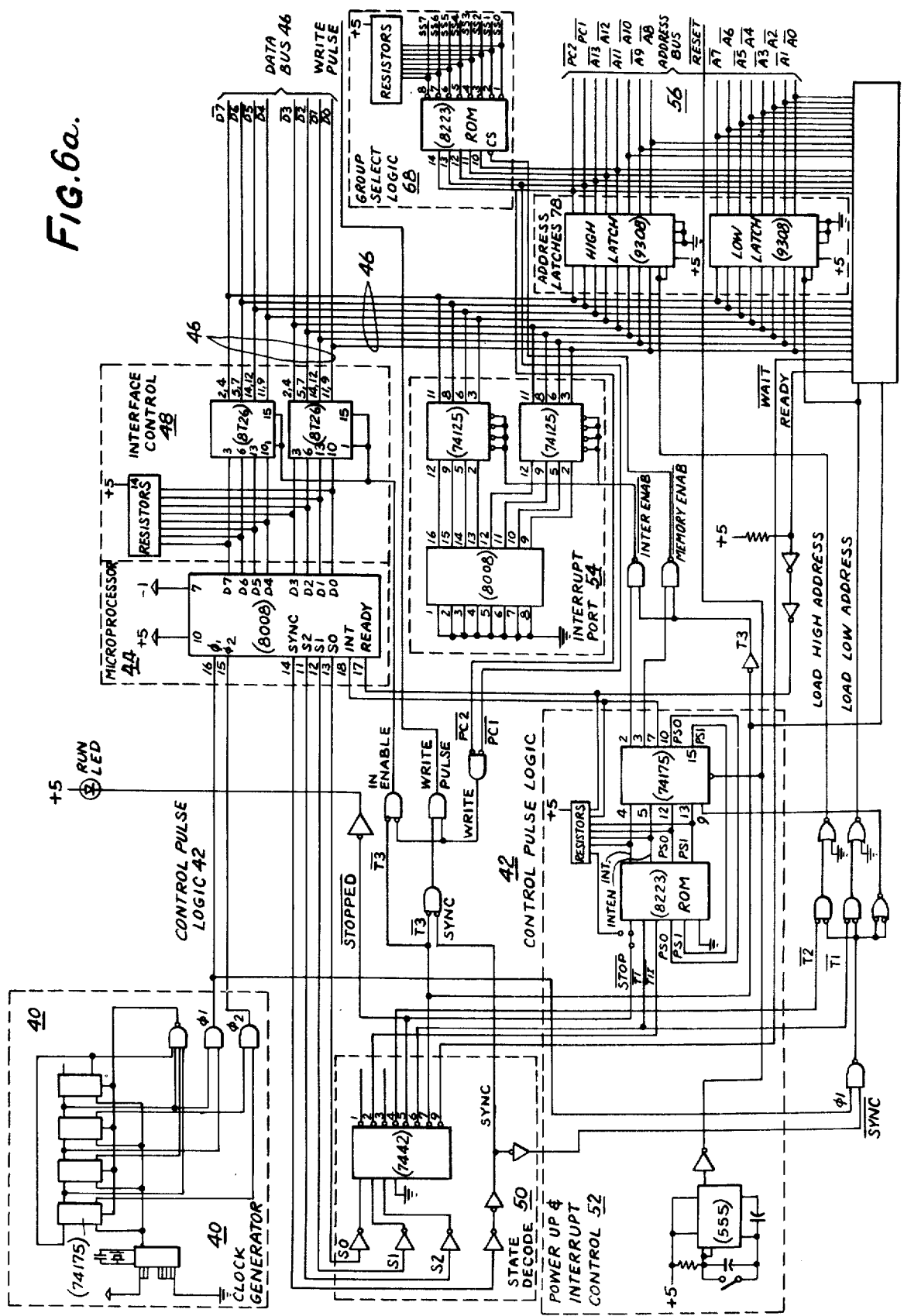
Figure 6B:
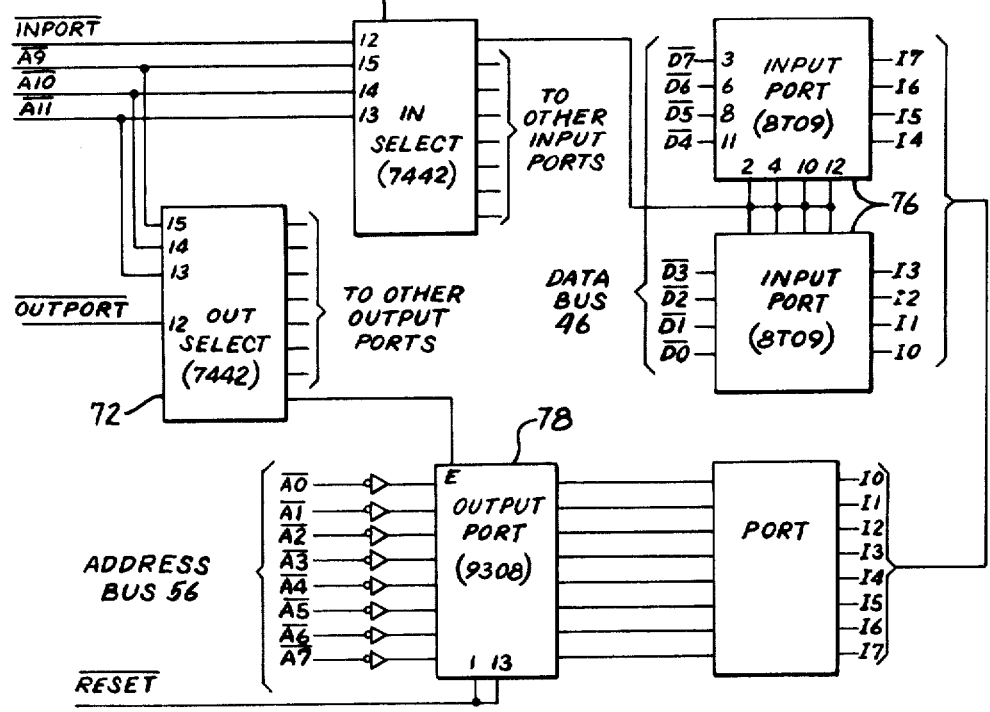
Figure 6C:
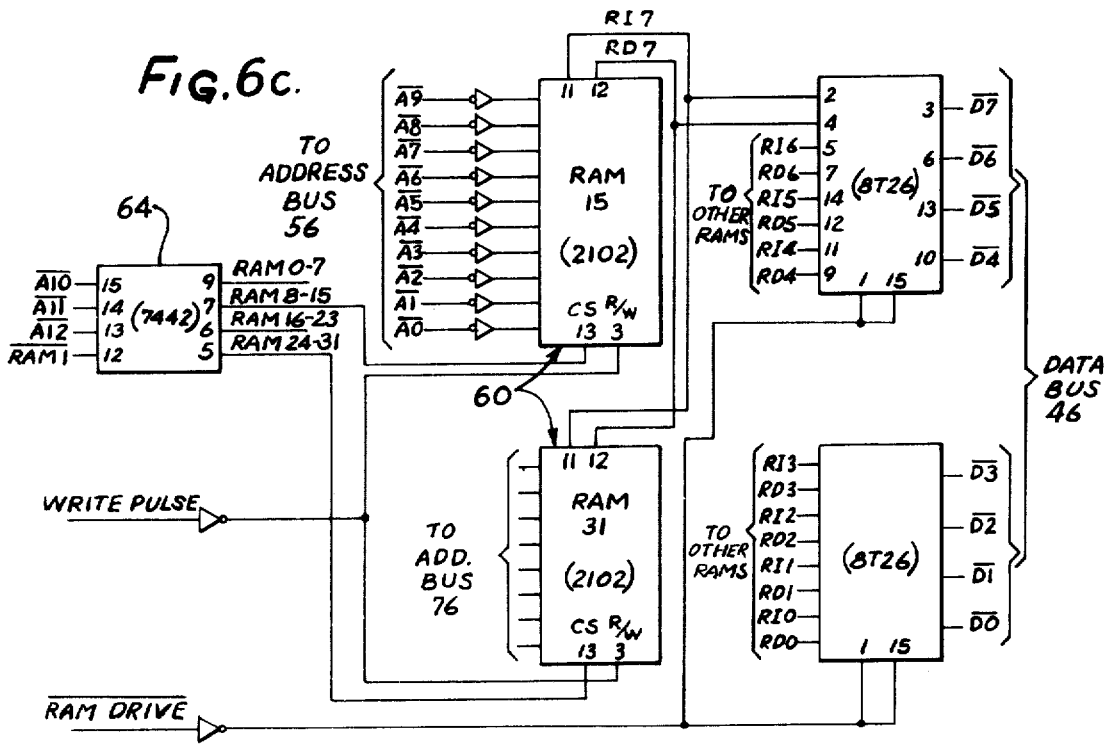

Communication between the controller 14a and one of the modules 24a, 24b or the like is accomplished using a basic format that includes 11-bit words that are transmitted and received by the various modules and the group controller. As is shown in FIG. 7, the first negative going edge 90 starts the 11-bit word and the first bit is a start bit 92 followed by 7 data bits 94, a steering bit 96, a parity bit 98 and a stop bit 100. The steering bit 96 is the most significant bit since it determines whether the word is an address or a command. The steering bit may be either high or low, with a high steering bit 96 designating an address as shown in the left 11-bit word and designating a command if it is low, as shown in the right 11-bit word. The parity bit 98 is selected to be even parity in that it counts the number of positive or high bits that are contained in a particular word, and if the number is an odd number, a high bit is used for the parity bit 98. However, if it is an even number up to the time of the parity bit, the parity bit will be low so that there will always be an even number of high bits in any 11-bit word. Once a stop bit is reached, the module receiving the address or command stops and waits for the next negative going edge 30 which starts the sequence over again in a manner previously described. The stop bit is high regardless of whether the word is an address or a command.

Within each of the bits of the word are a number of clock pulses or time slots, the data rate is preferably of a longer time duration than the frequency of the clock that is used in the controller and on the modules 24. For example, the data rate of the bits is preferably about 1/16 of the clock frequency so that the start pulse 92 and each of the data bits 94 as well as the steering bit 96 preferably contain 16 pulses of time slots. Thus, for example, if a clock is used having a clock frequency of 19,200 hertz, the data rate would be transmitted in the timing diagram shown in FIG. 7 would be 1/16 of that or about 1,200 Baud. Of course it should be understood that the data rate may be higher or lower than the 1200 Baud rate.

Referring generally to the circuit diagram of FIG. 5, which illustrates a typical control point adjuster 12a as well as a module 24a, the group controller 14a sends command signals that are adapted to control a positioning d.c. motor 110 which can be driven in either rotational direction by a drive circuit indicated generally at 112 which causes the current direction to be reversed depending upon whether a clockwise line 114 or counterclockwise line 116 is energized from the commands of the group controller 14a. Six lines, indicated generally at 118, provide status indication signals from a shaft position encoder or the like and provide information to the group controller that indicates the position of the shaft of the motor 110. The shaft position encoder may be substantially similar to that disclosed in copending application Ser. 683,787 now abandonded filed May 6, 1976 by Richard C. Barthel and Thomas P. Goodman, now abandoned, is assigned to the same assignee as the present invention. The status indications are 6-bit binary coded signals appearing on status lines S0-S5 and these signals are compared by comparators 120 which effectively compare the desired and actual positions of the shaft and selectively energize either of the lines 114 or 116 if the actual and desired positions do not favorably compare. The command signals for the desired position originate on command lines C0-C6 from a universal asynchronous transmitter/receiver (UART) indicated at 122 which transmits and receives information from the group controller 14a. The UART 122 together with a driver and receiver module 124, switches 126 and temporary storage registers 128 comprise the identification and transmit/receiver module 24a as previously described. The group controller 14a is connected to the modules 24 by two power supply lines which are not shown and by the transmit and receive lines 22 indicated in FIGS. 3 and 5. Thus, the upper of the two lines 22 shown in FIG. 5 is used to transmit data while the lower line indicated to be the line at which an address, command or other data is received. The lines 22 are connected to the driver/receiver circuit which is in turn connected to the UART. The UART is preferably a n-channel UART, model No. AY-5-1014A manufactured by General Instrument Corporation, and is driven by an oscillator 130 which has an output frequency that is compatible with the frequency of the clock 40 in the controller 14.

During operation, the group controller 14a will generate an address for identifying the particular module that is to be given a command, the controller addresses the particular module by sending an 11-bit word which is received by all of the modules through the receive line which is fed to the RI input of the UART 122. The UART includes holding registers which hold the word until the steering bit which is determined to be the most significant bit is received. Thus, the first word contained in bits 1 through 7 together with the steering bit 96 determined whether the information is an address or a command. If it is an address, the steering bit 96 is high while a command steering bit is low. The address that is received by the UART 122 is internally compared with a preset address in switches 126 that is unique to the particular module and in this way each of a plurality of modules can be connected to the common group controller. If the internal comparison of the address received from the group controller favorably compares with the code that is provided by the switches 126, then a valid address pulse is generated within the UART and conditions is to receive the next word which is the command word that appears on command lines C0-C6. If the group controller requests the status information that is present on lines S0-S5, the UART will first generate the identification code for switches 127 to indicate which of the modules is transmitting the information, followed by the coded information indicating the status on lines S0-S5.

The status information that is transmitted to the group controller merely indicates the position of the shaft of the control point adjuster so that the commands are properly carried out. The sensing device 16 provides the electrical information signal that is used to issue the commands to the control point adjuster 12 and the status information associated with the control point adjuster merely provides an indication of whether the commands are carried out. The status information provides a binary coded information signal that indicates the position of the shaft, with a resolution within less than about 6 angular degrees.

From the foregoing description of the modules and their interaction with their associated control point adjusters, it should be appreciated that the controller 14a can be connected to a large number of controlled devices and be capable of selectively communicating with the modules, control point adjusters and sensing devices 16 associated with the controlled device by virtue of the unique address and identification codes that are used in the transfer of information. Only a single pair of lines 22 (excluding the power lines) are needed to interconnect the group controller 14a with the equipment controlling the devices 10. The limitation as to the number of control devices is primarily a function of the size of the memory in the group controller itself. The group controller 14a is effectively serially connected to a plurality of sensing devices 16 and the group controller can effectively control the conditions of each individual device 10 as in an individual control loop. The information signals are segregated within the memory of the controller so that individual set points of each control loop can be compared with the feedback of instantaneous conditions of the controlled parameter or variable through the serially connected sensing devices 16. Each individual control loop within the group controller is preferably assigned to an existing control algorithm so that proper control actions can be taken based on the individual control loop characteristics.

The algorithms contained within the memory of the group controller are preferably classified or grouped together based upon the specific control characteristics of the individual control loop or family of control loops so that the controlled parameter or variable will behave in the desired manner. The algorithms stored in the memory are basically mathematical models based on various time response characteristics, as well as gain, linearity and the like which enable the achievement of the desired controlled variable time response.

An individual control loop may have its own set point specified by the keyboard and display unit 20a and the set points can be stored in the memory. The controlled parameter or variable is preferably periodically compared with the set point and corrective action is taken in the form of commands issued to the control point adjusters via the modules through the proper algorithms. In other words, all the detailed information for each individually controlled loop are located in the memory of the controller so that the engineering unit, type of sensor, linearity, and the like are known.

It should also be understood that a memory can contain other specific instructions for each control loop which may, for example, control the heating season set point as well as the cooling season set point so that the controller can determine, based upon the calendar time, cooling season, heating season or other information, the specific changes that may be required in the set point. More specifically with respect to the heating and cooling change of set point, the calendar hardware may determine the season and the set point can be determined by the specific instructions that are contained in the group controller memory so that the heating season set point of 68°, for example, and the cooling season set point of 78°, for example, are automatically performed once the cooling or heating mode is implemented. These and other special instructions can easily be implemented by the group controller because of the flexibility of the memory.

The individual control loop information can also be modified by the use of the keyboard and display unit 20 which permits an operator to change the set point of any of the control loops by using the keyboard. The display unit may be a printing device which would permit generally continuous recording of each individual control loop variable or parameter behavior, the display of the engineering units associated with parameters, as well as other information that may be desired.

While the specific embodiments that have been illustrated and described herein primarily incorporate a microprocessor, it should also be understood that a minicomputer or other hardwired logic may be used, if they can perform the control functions that have been described.

It should also be appreciated that in the event the group controller 14a controls a relatively small number of controlled devices 10, a full extensive keyboard device may be economically undesirable. In such instance, an abbreviated push button keyboard having only a relatively small number of buttons to segregate the type of inputs may be utilized, i.e., the number being much less than a full typewriter keyboard. For example, the device may have push buttons labeled for example, "set point display", "set point change", "special rule change", "change of control loop to a different algorithm", "delete control loop", in addition to a full numerical keyboard for inserting new set point values.

From the foregoing description, it should also be appreciated that the basic information communication system is in binary coded information which is transmitted from the controller to the transmitter/receiver module and, because of the manner in which the group controller operates, it is compatible with the centrally located computer controlled automated system that may be used. In other words, the group controller of the present invention is compatible with centrally controlled automated systems and may be incorporated in such systems without experiencing redundant control with the concomitant redundant cost. Stated in other words, the single sensing device is used for the control loop in which the group controller controls the device as well as generates information that can be used by the central computer in an automated system. Moreover, the command from the central control computer can be forwarded to the group controller and then to the module 24 and CPA for adjusting the control device. All that is necessary is that the information be forwarded in compatible binary coded information words that the transmitter/receiver module 24 can recognize together with the proper address codes.

It is, of course, understood that although preferred embodiments of the present invention have been illustrated and described, various modifications thereof will become apparent to those skilled in the art and, accordingly, the scope of the present invention should be defined only by the appended claims and equivalents thereof.

Various features of the invention are set forth in the following claims.

What is claimed is:

1. A system for monitoring and controlling a plurality of controlled apparatus which in turn control environmental and temperature parameters comprising:

control means for controlling said plurality of controlled apparatus having associated memory means containing stored information signals relating to the desired status of a parameter and the operating characteristics for each of said plurality of controlled apparatus, said control means being adapted to receive information signals from sensing means associated with each controlled apparatus, process said received information signals, including comparing the same with the stored parameter information signals and issue command signals in response to the stored and received information signals to all adjusting means operatively connected to each controlled apparatus;

sensing means adapted to measure the status of the parameter associated with each controlled apparatus and produce information signals indicative of the parameter;

a plurality of adjusting means, each being operably connected to a controlled apparatus for adjusting the same in response to receiving command signals from said control means;

said control means being further adapted to transmit an address signal for said command signals to every adjusting means; and each of said plurality of adjusting means having a first comparison means for comparing said address signal with an internal address signal, signal means for providing signals indicating the status of said controlled apparatus, and second comparison means for comparing the status signals with the command signals in the event the two address signals identically compare whereby the controlled apparatus may be adjusted until the status of same compares with said command signal.

2. A system as defined in claim 1 wherein said control means is adapted to transmit command and address signals and receive information signals in serial form.

3. A system as defined in claim 2 wherein said adjusting means is adapted to receive command and address signals and transmit information signals in serial form.

4. A system as defined in claim 1 further comprising means for selectively displaying the stored information and the received information regarding the status of said parameters.

5. A system as defined in claim 4 wherein said display means comprises an automatic typewriter.

6. A system as defined in claim 4 wherein said display means comprises a cathode ray display tube.

7. A system as defined in claim 1 further including means for transmitting an identification signal that identifies the controlled apparatus from which information signals originate.

8. A system as defined in claim 1 further comprising means for entering and changing said stored information signals in said memory means for each of said controlled apparatus.

9. A system as defined in claim 8 wherein said entering means comprises a series of specific function keys and a numeric keyboard, said function keys being adapted to cause said control means to perform a specific series of instructions relating to the control of one of said controlled apparatus.

10. A system as defined in claim 8 wherein said entering means comprises an alpha-numeric keyboard.

11. A system as defined in claim 9 wherein said control means is adapted to follow predetermined algorithms located in said memory means, said algorithms being related to the operation of said controlled apparatus, said function keys of said entering means being adapted to address and selectively retrieve said algorithms to display information relating to the operation of certain apparatus, and for changing the values or operation of said apparatus.

12. A controller for controlling two or more devices that are used to regulate the temperature and environmental conditions in an air conditioning system;

said controller having processing and memory means associated therewith, said memory means being adapted to store preselected electrical information signals relating to the temperature, humidity and other parameters which the devices regulate, said processing means being adapted to compare information signals received from sensing means with said preselected information signals and issue command signals and address signals for adjusting said devices;

means for entering and changing said stored information signals within said memory means to thereby alter the temperature and humidity ranges which said devices regulate;

means for displaying said preselected and received information for each of said devices;

sensing means for measuring the temperature, humidity or the like and for providing electrical information signals indicative of the same to said processing means; and means associated with said devices for adjusting the same in response to receiving said electrical command signals, said adjusting means having means for comparing said address signal with an internal address signal and responding to said command signal in the event the two address signals compare.

13. A controller as defined in claim 12 wherein said memory means has a number of sets of operating instructions stored therein as electrical signals, said processing means being adapted to retrieve said signals relating to said operating instructions and issue said electrical command signals which implement said operating instructions relating to the device being controlled.

14. A controller as defined in claim 13 wherein said entering and changing means comprises an alpha-numeric keyboard means.

15. A controller as defined in claim 13 wherein said entering and changing means is adapted to insert specific values relating to the operation of each controlled device and to change said values if desired.

16. A controller as defined in claim 13 wherein said entering and changing means comprises a series of specific operating function keys and a numeric keyboard, said function keys being adapted to cause said processing means to retrieve signals from said memory means for issuing a command for carrying out a specific set of instructions relating to the operation of one of said devices.

17. A controller as defined in claim 12 wherein said display means comprises means for printing information relating to the operation of a device.

18. A controller as defined in claim 12 wherein said display means comprises a cathode ray tube.

* * * * *

UNITED STATES PATENT AND TRADEMARK OFFICE
CERTIFICATE OF CORRECTION

PATENT NO. : 4,123,796
DATED : October 31, 1978
INVENTOR(S) : James Y. Shih

It is certified that error appears in the above-identified patent and that said Letters Patent are hereby corrected as shown below:

Column 4, line 25, after "through" delete "the" (first occurrence.

Column 4, line 52, delete "30" and insert --90-- therefor.

Column 5, line 18, delete "now abandonded".

Column 5, line 20, after "abandoned," insert --which--.

Column 6, line 6, delete "for" and insert --from-- therefor.

Signed and Sealed this

Twenty-second Day of May 1979

[SEAL]

Attest:

RUTH C. MASON
Attesting Officer

DONALD W. BANNER
Commissioner of Patents and Trademarks